United States Patent
Sharma et al.

(10) Patent No.: US 12,189,534 B2
(45) Date of Patent: Jan. 7, 2025

(54) CACHE BLOCKING FOR DISPATCHES

(71) Applicants: ADVANCED MICRO DEVICES, INC., Santa Clara, CA (US); ATI TECHNOLOGIES ULC, Markham (CA)

(72) Inventors: Saurabh Sharma, Santa Clara, CA (US); Hashem Hashemi, Santa Clara, CA (US); Paavo Pessi, Noormakuu (FI); Mika Tuomi, Noormakuu (FI); Gianpaolo Tommasi, Santa Clara, CA (US); Jeremy Lukacs, Santa Clara, CA (US); Guennadi Riguer, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 418 days.

(21) Appl. No.: 17/564,474

(22) Filed: Dec. 29, 2021

(65) Prior Publication Data
US 2023/0205698 A1   Jun. 29, 2023

(51) Int. Cl.
G06F 9/46        (2006.01)
G06F 9/48        (2006.01)
G06F 12/0855   (2016.01)

(52) U.S. Cl.
CPC ........ *G06F 12/0855* (2013.01); *G06F 9/4806* (2013.01); *G06F 2212/1008* (2013.01)

(58) Field of Classification Search
CPC .................................................... G06F 9/4806
See application file for complete search history.

(56) References Cited

U.S. PATENT DOCUMENTS

| 2018/0285118 A1 | 10/2018 | Eisen et al. |
| 2018/0293097 A1 | 10/2018 | Rhee et al. |
| 2019/0155604 A1 | 5/2019 | Emberling et al. |
| 2021/0133041 A1 | 5/2021 | Ugale et al. |

FOREIGN PATENT DOCUMENTS

KR   10-2021-0097010   8/2021

OTHER PUBLICATIONS

International Search Report and Written Opinion issued in Application No. PCT/US2022/053566, mailed May 8, 2023, 10 pages.
International Preliminary Report on Patentability issued in Application No. PCT/US2022/053566, mailed Jul. 11, 2024, 7 pages.

*Primary Examiner* — Gregory A Kessler

(57) ABSTRACT

A processing system divides successive dispatches of work items into portions. The successive dispatches are separated from each other by barriers, each barrier indicating that the work items of the previous dispatch must complete execution before work items of a subsequent dispatch can begin execution. In some embodiments, the processing system interleaves execution of portions of a first dispatch with portions of subsequent dispatches that consume data produced by the first dispatch. The processing system thereby reduces the amount of data written to the local cache by a producer dispatch while preserving data locality for a subsequent consumer (or consumer/producer) dispatch and facilitating processing efficiency.

20 Claims, 6 Drawing Sheets

CACHE BLOCKING FOR DISPATCHES

BACKGROUND

Parallel processing units such as graphics processing units (GPUs) and other multithreaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores.

A hierarchical execution model defines a kernel of instructions that are executed using different data sets. For example, a dispatch of a grid of work items (also referred to herein as threads or streams) corresponding to, e.g., pixels of a display, accesses a data set stored at a cache of a parallel processing unit. Some data sets, such as surfaces or textures, are modified and read by successive dispatches. For example, a first dispatch, referred to as a producer dispatch, writes data to the cache, and subsequent dispatches, referred to as consumer/producer dispatches, read and modify the data written by the producer dispatch. A consumer dispatch reads data written by a previous dispatch. However, the amount of data that can be stored at the cache is constrained by the size of the cache, and the amount of data produced by a producer dispatch frequently exceeds the storage capacity of the cache, resulting in "thrashing" of the cache. Such data is often evicted from the cache before it can be read by a subsequent dispatch.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
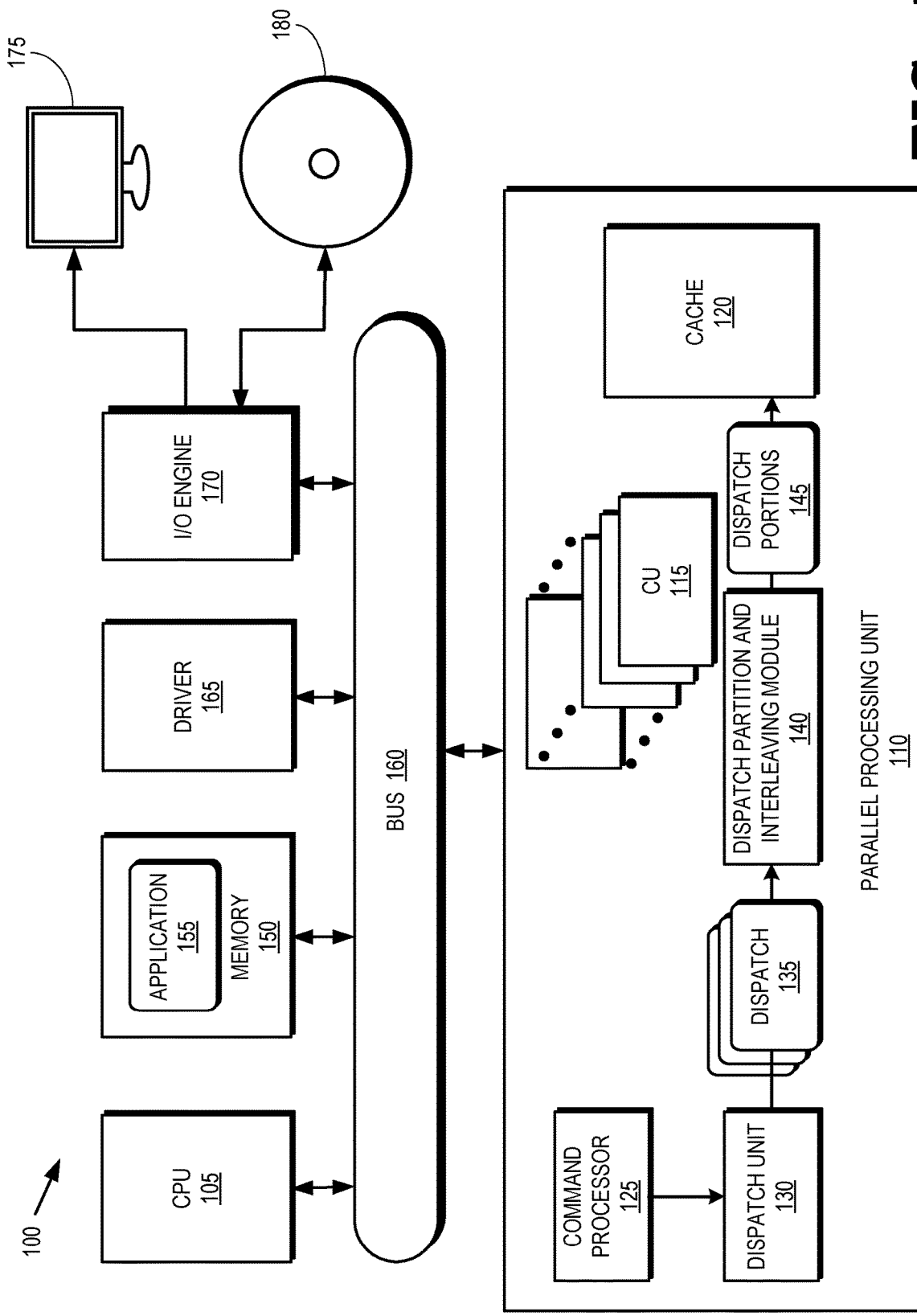
FIG. 1 is a block diagram of a processing system configured to divide successive dispatches into portions and interleave execution of the portions in accordance with some embodiments.

Processor cores of parallel processing units often execute dispatches of work items that successively access the same sets of data such that spatial and/or temporal data locality exists within and between dispatches. To illustrate, a surface such as texture that is attached to a series of dispatches of work items is read in successive rendering or denoising passes. For example, a first dispatch of work items corresponding to pixels rendering objects in a scene generates global illumination, while a second dispatch of work items generates shadowing or performs filtering. Both the first and second dispatches require the same texture data that maps to the pixels. In some instances, work items of a first dispatch produce data such as an unordered access view (UAV) buffer or render target that is consumed by work items of a subsequent dispatch as a texture in what is referred to as read-after-write locality.

In the course of executing instructions, a processor core of a parallel processing unit accesses data that is stored at a local cache from which accesses initiated by the processor core are performed relatively quickly and with a relatively low expenditure of energy, or at more remote level of a memory hierarchy from which accesses initiated by the processor core are performed relatively slowly and with a relatively high expenditure of energy. Typically, the more proximate to a processor core that data is stored in the memory hierarchy, the more quickly and energy-efficiently it is accessed by the processor core. To enhance processing efficiency, some processing systems implement a memory management protocol that moves data that has recently been requested for access to levels of the memory hierarchy closer to the processor core, with the expectation that the data will be accessed again by the processor core in the near future and moves data that has not been accessed recently to more remote levels of the memory hierarchy.

For successive dispatches of work items in which a subsequent consumer (or consumer/producer) dispatch consumes data produced by a previous producer dispatch, storing the data produced by the producer dispatch at a local cache accessible by the consumer dispatch facilitates relatively quick access by the processor core. However, in many cases the amount of data produced by a producer dispatch exceeds the storage capacity of the local cache, resulting in eviction of the data to more remote levels of the memory hierarchy, from which the data must be fetched for processing by the subsequent consumer dispatch.

To reduce the amount of data written to the local cache by a producer dispatch while preserving data locality for a subsequent consumer (or consumer/producer) dispatch, the processing system divides successive dispatches of work items into portions. The successive dispatches are separated from each other by barriers, each barrier indicating that the work items of the previous dispatch must complete execution before work items of a subsequent dispatch can begin execution. In some embodiments, the processing system divides a first producer dispatch (referred to as the first dispatch) into a finite number of portions, in which the first portion (with a start position of (0,0) for a two-dimensional (2-D) dispatch or a start position of (0,0,0) for a three-dimensional (3-D) dispatch) is sized such that the data written by the first portion does not exceed the storage capacity of the local (lowest-level) cache. In some embodiments, the portions of the first producer dispatch are equally sized. In other embodiments, the portions of the first producer dispatch are unevenly sized. For example, the first portion of the first dispatch is sized larger than the other portions of the first dispatch.

The processing system divides a consumer/producer or consumer dispatch (referred to as the second dispatch) that immediately follows—and consumes the data produced by—the first producer dispatch into a finite number of portions. To ensure coherency such that consumer dispatches consume the correct (intended) data produced by a previously executed portion of a producer dispatch, the processing system inserts barriers between portions to ensure that the consumer dispatch portion does not execute until the producer dispatch portion has completed execution.

In some embodiments, the portions of the second dispatch are equally sized. In other embodiments, the portions of the second dispatch are unevenly sized. For example, in some embodiments, the processing system sizes a first portion of the second dispatch (with a start position of (0,0) for a two-dimensional (2-D) dispatch or a start position of (0,0,0) for a three-dimensional (3-D) dispatch) to be smaller than the first portion of the first dispatch, such that the work items of the first portion of the second dispatch have access to data produced by neighboring work items of the first portion of the first dispatch to perform, e.g., filtering or averaging.

The processing system divides the series of dependent dispatches into the same number of portions (i.e., blocks or tiles) regardless of the nature of the dependency (i.e., whether the dependency is simple or complex). The portion size for the producer dispatch can differ from the portion size for the consumer dispatch; however, the number of portions between the producer dispatch and the consumer dispatch remains the same. The processing system can thereby place the barriers between the portions in a performant manner.

To facilitate processing efficiency, in some embodiments, the processing system interleaves execution of portions of the first dispatch with portions of subsequent dispatches that consume data produced by the first dispatch. For example, in some embodiments, the processing system executes a first portion of the first dispatch followed by a first portion of the second dispatch, followed by a second portion of the first dispatch, followed by a second portion of the second dispatch. By interleaving execution of portions of the dispatches, the processing system balances workload among compute units.

FIG. 1 illustrates a processing system 100 configured to divide successive dispatches into portions and interleave execution of the portions in accordance with some embodiments. The processing system 100 includes a parallel processing unit 110 such as a graphics processing unit (GPU) for creating visual images intended for output to a display 175 according to some embodiments. A parallel processor is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). Although the below description uses a graphics processing unit (GPU), for illustration purposes, the embodiments and implementations described below are applicable to other types of parallel processors.

The processing system 100 includes a memory 150. Some embodiments of the memory 150 are implemented as a dynamic random-access memory (DRAM). However, the memory 150 can also be implemented using other types of memory including static random-access memory (SRAM), nonvolatile RAM, and the like. In the illustrated embodiment, the parallel processing unit 110 communicates with the memory 150 over a bus 160. However, some embodiments of the parallel processing unit 110 communicate with the memory 150 over a direct connection or via other buses, bridges, switches, routers, and the like. The parallel processing unit 110 executes instructions stored in the memory 150 and the parallel processing unit 110 stores information in the memory 150 such as the results of the executed instructions. For example, the memory 150 can store a copy of instructions from an application 155 that is to be executed by the parallel processing unit 110. Some embodiments of the parallel processing unit 110 include multiple processor cores (referred to as compute units) 115 that independently execute instructions concurrently or in parallel.

The processing system 100 is generally configured to execute sets of instructions (e.g., computer programs) such as application 155 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

The processing system 100 includes a central processing unit (CPU) 105 for executing instructions. Some embodiments of the CPU 105 include multiple processor cores (not shown in the interest of clarity) that independently execute instructions concurrently or in parallel. The CPU 105 is also connected to the bus 160 and therefore communicates with the parallel processing unit 110 and the memory 150 via the bus 160. The CPU 105 executes instructions such as program code for the application 155 stored in the memory 150 and the CPU 105 stores information in the memory 150 such as the results of the executed instructions. The CPU 105 is also able to initiate graphics processing by issuing draw calls to the parallel processing unit 110. A draw call is a command that is generated by the CPU 105 and transmitted to the parallel processing unit 110 to instruct the parallel processing unit 110 render an object in a frame (or a portion of an object). Some embodiments of a draw call include information defining textures, states, shaders, rendering objects, buffers, and the like that are used by the parallel processing unit 110 to render the object or portion thereof. The parallel processing unit 110 renders the object to produce values of pixels that are provided to a display 175, which uses the pixel values to display an image that represents the rendered object.

In some embodiments, each frame to be rendered is processed by the parallel processing unit 110 graphics pipeline in multiple passes. For example, during a first pass over the scene geometry, only the attributes necessary to compute per-pixel lighting are written to a G-buffer. During a second pass, the graphics pipeline outputs only diffuse and specular lighting data. In a third pass of the frame through the graphics pipeline, the graphics pipeline reads back lighting data and outputs the final per-pixel shading. Thus, in multi-pass rendering, a scene and associated objects of a frame are rendered multiple times. Each time the object is drawn, the graphics pipeline calculates an additional aspect of object's appearance and combines the additional aspect with the previous results. Each time the frame or objects of the frame are rendered by the graphics pipeline is referred to as a render pass.

An input/output (I/O) engine 170 handles input or output operations associated with the display 175, as well as other elements of the processing system 100 such as keyboards, mice, printers, external disks, and the like. The I/O engine 170 is coupled to the bus 160 so that the I/O engine 170 communicates with the parallel processing unit 110, the memory 150, or the CPU 105. In the illustrated embodiment, the I/O engine 170 is configured to read information stored on an external storage medium 180, such as a compact disk (CD), a digital video disc (DVD), and the like. The external storage medium 180 stores information representative of program code used to implement an application such as a video game. The program code on the external storage medium 180 can be written to the memory 150 to form a copy of instructions that are to be executed by the parallel processing unit 110 or the CPU 105.

In some embodiments, the parallel processing unit 110 implements a graphics pipeline (not shown in FIG. 1 in the interest of clarity) that includes multiple stages configured for concurrent processing of different primitives in response to a draw call. Stages of the graphics pipeline in the parallel processing unit 110 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

Driver 165 is a computer program that allows a higher-level graphics computing program, such as from application 155, to interact with parallel processing unit 110. For example, the driver 165 translates standard code received from application 155 into a native format command stream understood by parallel processing unit 110. Driver 165 allows input from application 155 to direct settings of the parallel processing unit 110. Such settings include selection of a render mode, an anti-aliasing control, a texture filter control, a batch binning control, and deferred pixel shading control.

To execute the sets of commands received from the CPU, the parallel processing unit 110 includes a command processor 125, a dispatch unit 130, a plurality of compute units 115, and a cache 120. The command processor 125 is a set of hardware configured to receive the commands from the CPU 105 and to prepare the received commands for processing. For example, in some embodiments the command processor 125 buffers the received commands, organizes the received commands into one or more queues for processing, performs operations to decode or otherwise interpret the received commands, and the like.

The dispatch unit 130 is a set of hardware configured to perform dispatch operations in response to dispatch commands (not shown) received from the command processor 125. Responsive to a dispatch command, the dispatch unit 130 accesses a grid of work items and dispatches subsets (e.g., dispatch 135) of the work items to the compute units 115 for processing as a wavefront. Unlike a draw call, dispatch 135 can be processed by the parallel processing unit 110 without going through the graphics pipeline.

The plurality of compute units 115 together perform shading operations on dispatches (e.g., dispatch 135) dispatched by the dispatch unit 130. In different embodiments, the compute units 115 perform geometry operations, texture operations, tessellation operations, vertex operations, mesh operations, primitive operations, ray tracing operations, compute operations, and the like or any combination thereof, based on commands received from the command processor 125. In some embodiments, to perform these operations the compute units 115 each include one or more SIMD elements configured to execute the specified operations using the work items of the received dispatches.

The cache 120 stores data for the plurality of compute units 115. Thus, in the course of executing shader operations, the plurality of compute units 115 stores and retrieves data from the cache 120, wherein the stored and retrieved data is based on the particular work items being processed. For example, in some embodiments each work item of the dispatch 135 corresponds to an individual pixel of an image, and the cache 120 stores data (e.g., texture values) for each individual pixel, or a subset of the individual pixels, included in the dispatch 135. In some embodiments, the parallel processing unit 110 is associated with a memory hierarchy having multiple cache levels as well as a system memory 150, and the cache 120 represents one of the multiple cache levels.

To facilitate accesses to the cache 120 that leverage data locality between dispatches, the parallel processing unit 110 includes a dispatch partition and interleaving module 140. The dispatch partition and interleaving module 140 can be implemented in hardware, firmware, software, or a combination thereof. The dispatch partition and interleaving module 140 analyzes the locality of data stored at the cache 120 for consecutive dispatches such as dispatch 135 and partitions the dispatches into a finite number of portions 145 based on data locality of the data stored at the cache 120 and the storage capacity of the cache 120 for storing data produced by work items of the application 155. For example, if the dispatch partition and interleaving module 140 determines that data produced by dispatch 135 will be consumed by the subsequent dispatch (not shown) and will exceed the storage capacity of the cache 120, in some embodiments, the dispatch partition and interleaving module 140 divides dispatch 135 and the subsequent dispatch into a finite number of portions 145. By partitioning the dispatches 135 into portions 145 that produce data that fits within the cache 120, the dispatch partition and interleaving module 140 increases the probability that data needed for a subsequent access to the cache 120 will still be resident in the cache 120 at the time of the subsequent access, thus increasing the hit rate at the cache 120 and decreasing latency between dispatches.

In some embodiments, the dispatch partition and interleaving module 140 inserts barriers between portions 145 from different dispatches to ensure that all work items of a portion of a producer dispatch complete execution before work items of a portion of a dispatch that consumes data from the portion of the producer dispatch begin execution. The dispatch partition and interleaving module 140 interleaves execution of the portions 145 of the producer and consumer dispatches 135 to balance the workloads of the compute units 115 executing the work items of the dispatches 135.

Figure 2:
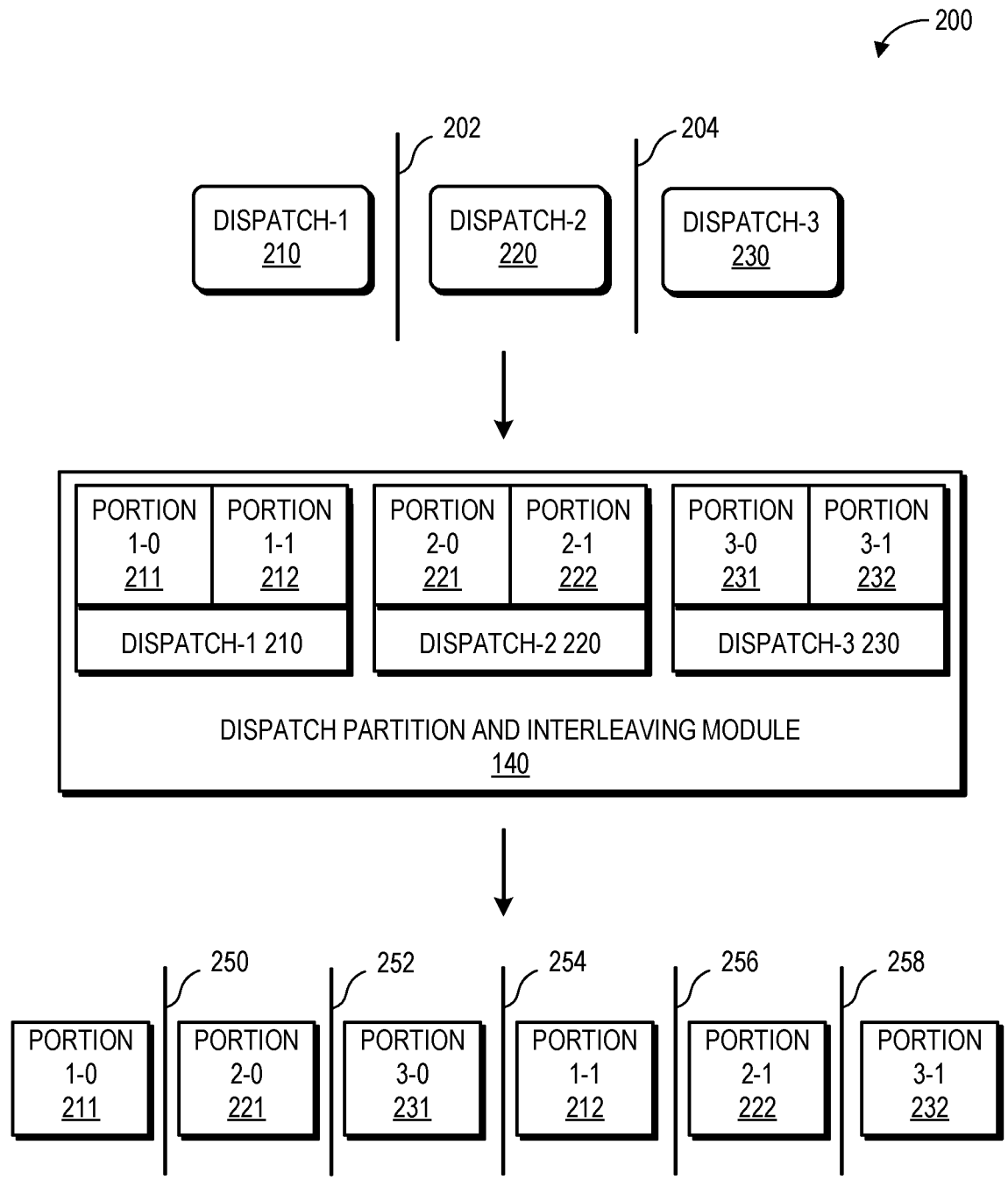
FIG. 2 is a block diagram of a dispatch partition and interleaving module partitioning successive dispatches into portions and inserting barriers between the partitions to interleave execution of the portions in accordance with some embodiments.

FIG. 2 is a block diagram 200 of the dispatch partition and interleaving module 140 partitioning consecutive dispatches into portions and inserting barriers between the partitions to interleave execution of the portions in accordance with some embodiments. In the illustrated example, the dispatch partition and interleaving module 140 receives three dispatches, dispatch-1 210, dispatch-2 220, and dispatch-3 230, that the dispatch partition and interleaving module 140 identifies as having data locality and as generating data that exceeds the capacity of the cache 120. Dispatch-1 210 is separated from dispatch-2 220 by a barrier 202 that has been inserted by the application 155. Similarly, dispatch-2 220 is separated from dispatch-3 230 by a barrier 204 that has been inserted by the application 155. The barriers 202, 204 indicate that the first dispatch must complete execution before execution of the second dispatch can begin.

The dispatch partition and interleaving module 140 divides each of dispatch-1 210, dispatch-2 220, and dispatch-3 230 into two portions. Thus, the dispatch partition and interleaving module 140 divides dispatch-1 210 in portion 1-0 211 and portion 1-1 212. The dispatch partition and interleaving module 140 divides dispatch-2 220 into portion 2-0 221 and portion 2-1 222, and divides dispatch-3 230 into portion 3-0 231 and portion 3-1 232. In some embodiments, the portions of each dispatch are equally sized, and in other embodiments, the portions of each dispatch are unevenly sized.

The dispatch partition and interleaving module 140 interleaves the portions and inserts barriers between the portions to ensure that a first portion separated by a barrier from a second portion completes execution before the second portion begins execution. In the illustrated example, the dispatch partition and interleaving module 140 interleaves the portions as follows: the first portion to execute is portion 1-0 211, which is followed by a barrier 250. After portion 1-0 211 completes execution, portion 2-0 221 executes. A barrier 252 separates portion 2-0 221 from the next portion, portion 3-0 231. Thus, portion 2-0 221 completes execution before portion 3-0 231 executes. Portion 3-0 231 is separated by a barrier 254 from the next portion, portion 1-1 212, such that portion 3-0 231 must complete execution before portion 1-1 212 begins execution. A barrier 256 separates portion 1-1 212 from the next portion, portion 2-1 222, such that portion 1-1 212 must complete execution before portion 2-1 222 executes. The last portion, portion 3-1 232, is separated by a barrier 258 from portion 2-1 222. Thus, portion 2-1 222 must complete execution before portion 3-1 232 executes. By dividing the dispatches 210, 220, 230 into portions that are sized to generate data that does not exceed the storage capacity of the cache 120, the dispatch partition and interleaving module 140 prevents the dispatches 210, 220, 230 from thrashing the cache 120. Further, by interleaving the portions for execution, the dispatch partition and interleaving module 140 balances workloads across the compute units 115, such that fewer compute units 115 are idle while other compute units 115 are executing work items of portions of the dispatches 210, 220, 230.

Figure 3:
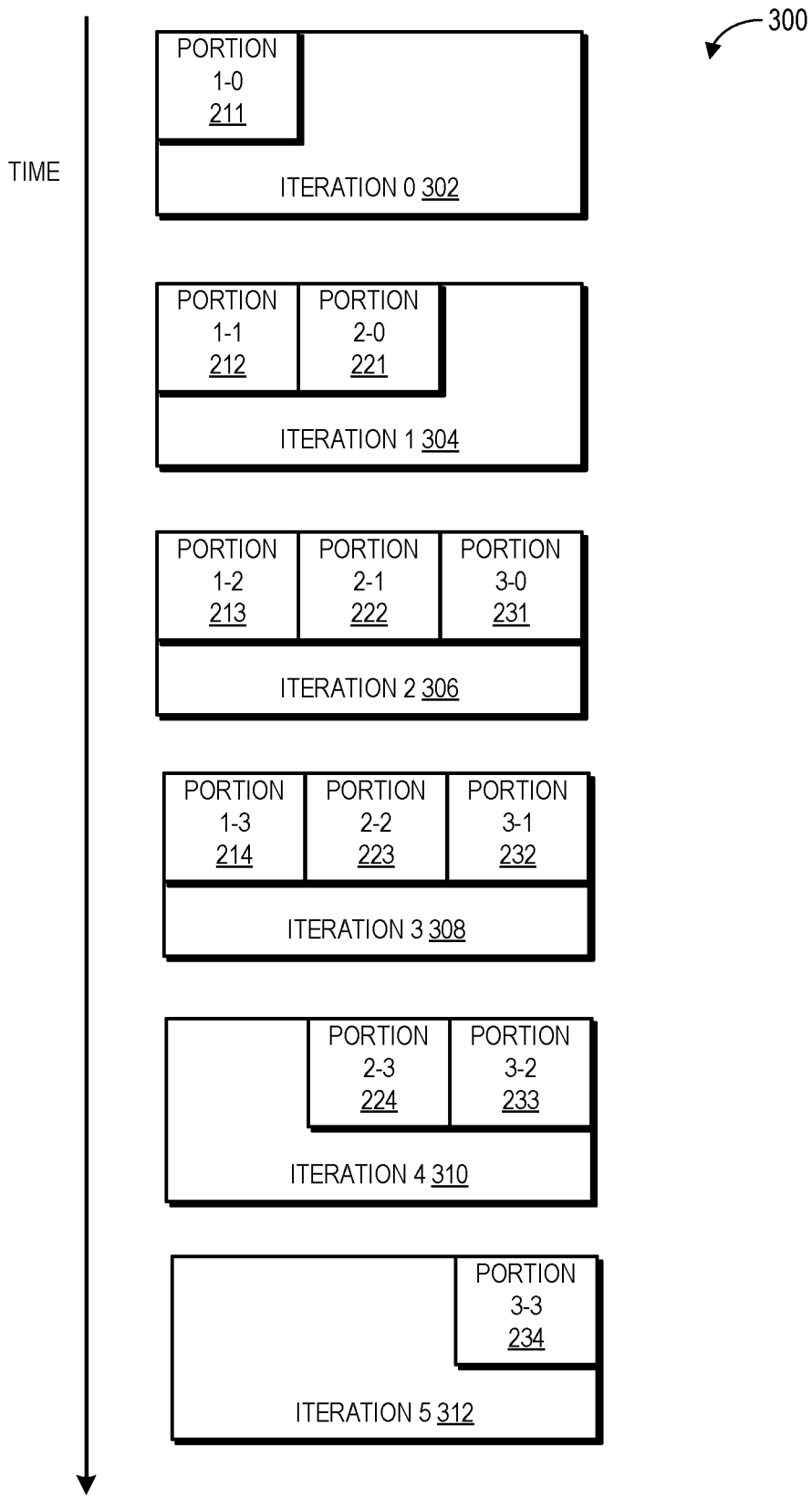
FIG. 3 is a diagram illustrating iterations of execution of the interleaved portions of successive dispatches in accordance with some embodiments.

FIG. 3 is a diagram 300 illustrating iterations of execution of the interleaved portions of successive dispatches in accordance with some embodiments. In the illustrated example, each of the three dispatches 210, 220, 230 of FIG. 2 have been divided into four portions. Thus, dispatch-1 210 has been divided into portion 1-0 211, portion 1-1 212, portion 1-2 213, and portion 1-3 214. Dispatch-2 220 has been divided into portion 2-0 221, portion 2-1 222, portion 2-2 223, and portion 2-3 224. Dispatch-3 230 has been divided into portion 3-0 231, portion 3-1 232, portion 3-2 233, and portion 3-3 234. Dispatch-1 210 is a producer dispatch that produces data for consumption by subsequent dispatches. Dispatch-2 220 is a consumer/producer dispatch that consumes data produced by dispatch-1 210 and produces data for consumption by subsequent dispatches. Dispatch-3 230 is a consumer dispatch that consumes data produced by previous dispatches 210, 220.

The portions of dispatches 210, 220, 230 are executed in six iterations, beginning with iteration 0 302. In iteration 0 302, portion 1-0 211 of producer dispatch-1 210 is executed. In some embodiments, portion 1-0 is sized to be larger than the other portions of producer dispatch-1 210, and to be larger than the portions of consumer/producer dispatch-2 220 and consumer dispatch-3 230. In iteration 1 304, portion 1-1 212 of produce dispatch-1 210 and portion 2-0 221 of consumer/producer dispatch-2 220 are executed. Portion 2-0 221 is executed in iteration 1 304, after execution of portion 1-0 211 has completed in iteration 0 302, because portion 2-0 221 consumes data produced by portion 1-0 211.

In iteration 2 306, portion 1-2 213 of producer dispatch-1 210, portion 2-1 222 of consumer/producer dispatch-2 220, and portion 3-0 231 of consumer dispatch-3 230 are executed. Portion 2-1 222 is executed in iteration 2 306, after execution of portion 1-1 212 has completed in iteration 1 304, because portion 2-1 222 consumes data produced by portion 1-1 212. Similarly, portion 3-0 231 is executed in iteration 2 306, after execution of portion 2-0 221 in iteration 1 304, because portion 3-0 231 consumes data produced by portion 2-0 221.

In iteration 3 308, portion 1-3 214 of producer dispatch-1 210, portion 2-2 223 of consumer/producer dispatch-2 220, and portion 3-1 232 of consumer dispatch-3 230 are executed. Portion 2-2 223 is executed in iteration 3 308, after execution of portion 1-2 213 has completed in iteration 2 306, because portion 2-2 223 consumes data produced by portion 1-2 213. Similarly, portion 3-1 232 is executed in iteration 3 308, after execution of portion 2-1 222 in iteration 2 306, because portion 3-2 232 consumes data produced by portion 2-1 222.

In iteration 4 310, portion 2-3 224 of consumer/producer dispatch-2 220 and portion 3-2 233 of consumer dispatch-3 230 are executed. Portion 2-3 224 is executed in iteration 4 310, after execution of portion 1-3 214 has completed in iteration 3 308, because portion 2-3 224 consumes data produced by portion 1-3 214. Similarly, portion 3-2 233 is executed in iteration 4 310, after execution of portion 2-2 223 in iteration 3 308, because portion 3-2 233 consumes data produced by portion 2-2 223.

In iteration 5 312, portion 3-3 234 of consumer dispatch-3 230 is executed. Portion 3-3 234 is executed in iteration 5 312, after execution of portion 2-3 224 in iteration 4 310, because portion 3-3 234 consumes data produced by portion 2-3 234. By interleaving and executing multiple portions in parallel, the dispatch partition and interleaving module 140 mitigates any performance penalty incurred by inserting the barriers (e.g., barriers 250, 252, 254, 256, 258) between portions.

Figure 4:
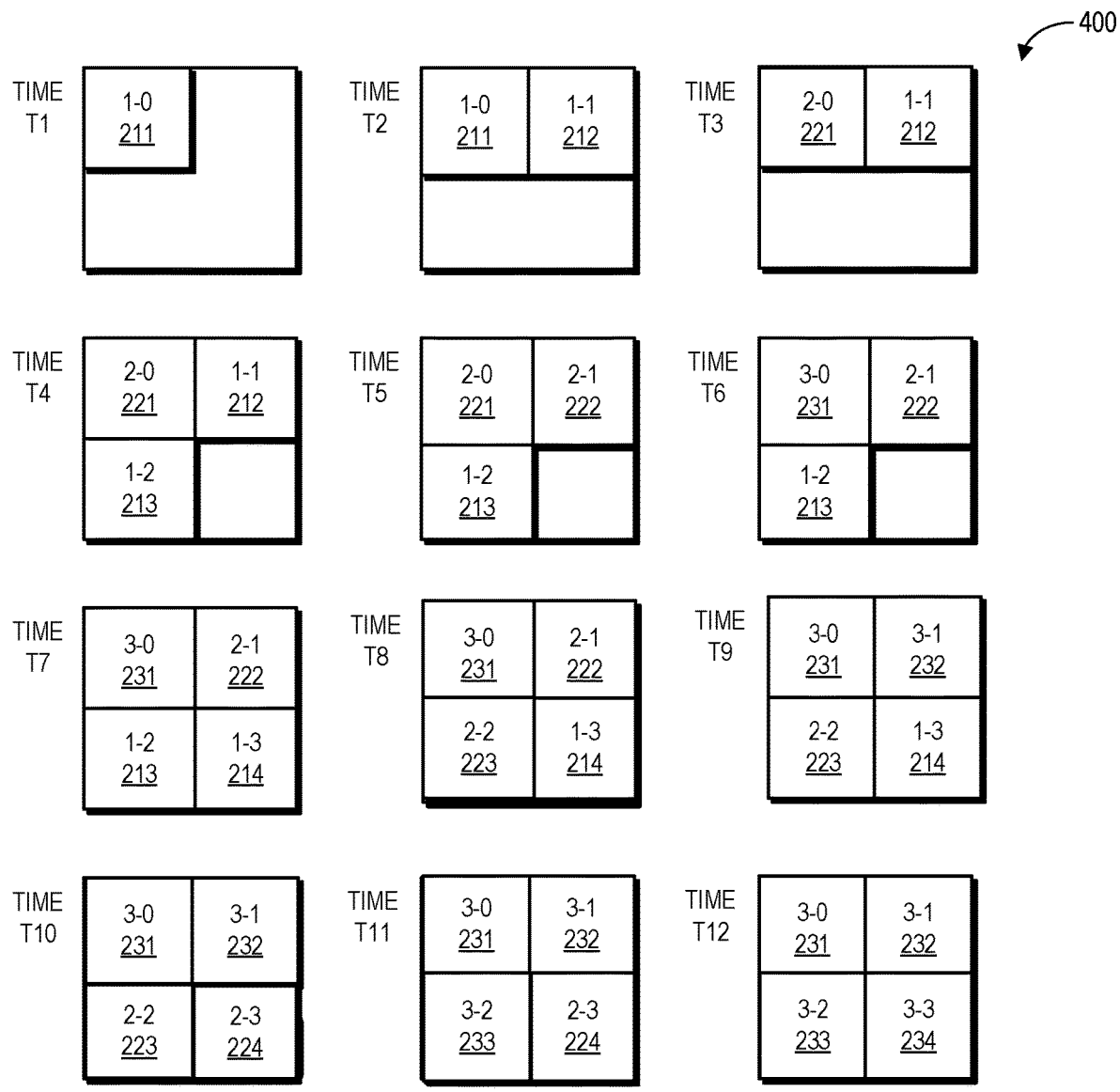
FIG. 4 is a diagram illustrating start positions of the interleaved portions of successive dispatches in accordance with some embodiments.

FIG. 4 is a diagram 400 illustrating relative start positions of the interleaved portions of successive dispatches in accordance with some embodiments. In the illustrated embodiment, referred to as "simple mapping", the portions of the dispatches 210, 220, 230 are equally sized and share the same start positions. For example, in the illustrated embodiment, portions 1-0 211, 2-0 221, and 3-0 231 use the same block dimensions and start positions.

At time T1, portion 1-0 211 executes, with a start position in the upper left corner of the grid of work items. At time T2, portions 1-0 211 and 1-1 212 execute. Portion 1-1 212 has a start position in the upper middle of the grid of work items, starting where portion 1-0 211 ends on a horizontal axis. Because portions 1-0 211 and 1-1 212 are both portions of the dispatch-1 210, there is no barrier between them and they can have overlapping executions. At time T3, portions 2-0 221 and 1-1 212 execute, with a start position for portion 2-0 221 in the upper left corner of the grid of work items. Portion 2-0 221 has the same size and start position as portion 1-0 211, which produces the data that portion 2-0 221 consumes. Because portion 2-0 221 does not consume data produced by portion 1-1 212, portion 2-0 221 and portion 1-1 212 can have overlapping executions.

At time T4, portions 2-0 221, 1-1 212, and 1-2 213 execute. Portion 1-2 213 has a start position at the middle left of the grid of work items, starting where portion 1-0 211 ends on a vertical axis and ending at the bottom of the grid of work items. At time T5, portions 2-0 221, 2-1 222, and 1-2 213 execute. Portion 2-1 222 has the same size and start position as portion 1-1 212, which produces the data that portion 2-1 222 consumes. At time T6, portions 3-0 231, 2-1 222, and 1-2 213 execute. Portion 3-0 231 has the same size and start position as portion 2-0 221, which produces the data that portion 3-0 231 consumes.

At time T7, portions 3-0 231, 2-1 222, 1-2 213, and 1-3 214 execute. Portion 1-3 214 has a start position in the middle of the grid of work items, starting where portion 1-2 213 ends on the horizontal axis and where portion 2-1 222 ends on the vertical axis, and ending at the bottom right of the grid of work items. At time T8, portions 3-0 231, 2-1 222, 2-2 223, and 1-3 214 execute. Portion 2-2 223 has the same size and start position as portion 1-2 213, which produces the data that portion 2-2 223 consumes. At time T9, portions 3-0 231, 3-1 232, 2-2 223, and 1-3 214 execute. Portion 3-1 232 has the same size and start position as portion 2-1 222, which produces the data that portion 3-1 232 consumes.

At time T10, portions 3-1 231, 3-1 232, 2-2 223, and 2-3 224 execute. Portion 2-3 224 has the same size and start position as portion 1-3 214, which produces the data that portion 2-3 224 consumes. At time T11, portions 3-0 231, 3-1 232, 3-2 233, and 2-3 224 execute. Portion 3-2 233 has the same size and start position as portion 2-2 223, which produces the data that portion 3-2 233 consumes. At time T12, portions 3-0 231, 3-1 232, 3-2 233, and 3-3 234 execute. Portion 3-3 234 has the same size and start position as portion 2-3 224, which produces the data that portion 3-3 234 consumes.

Figure 5:
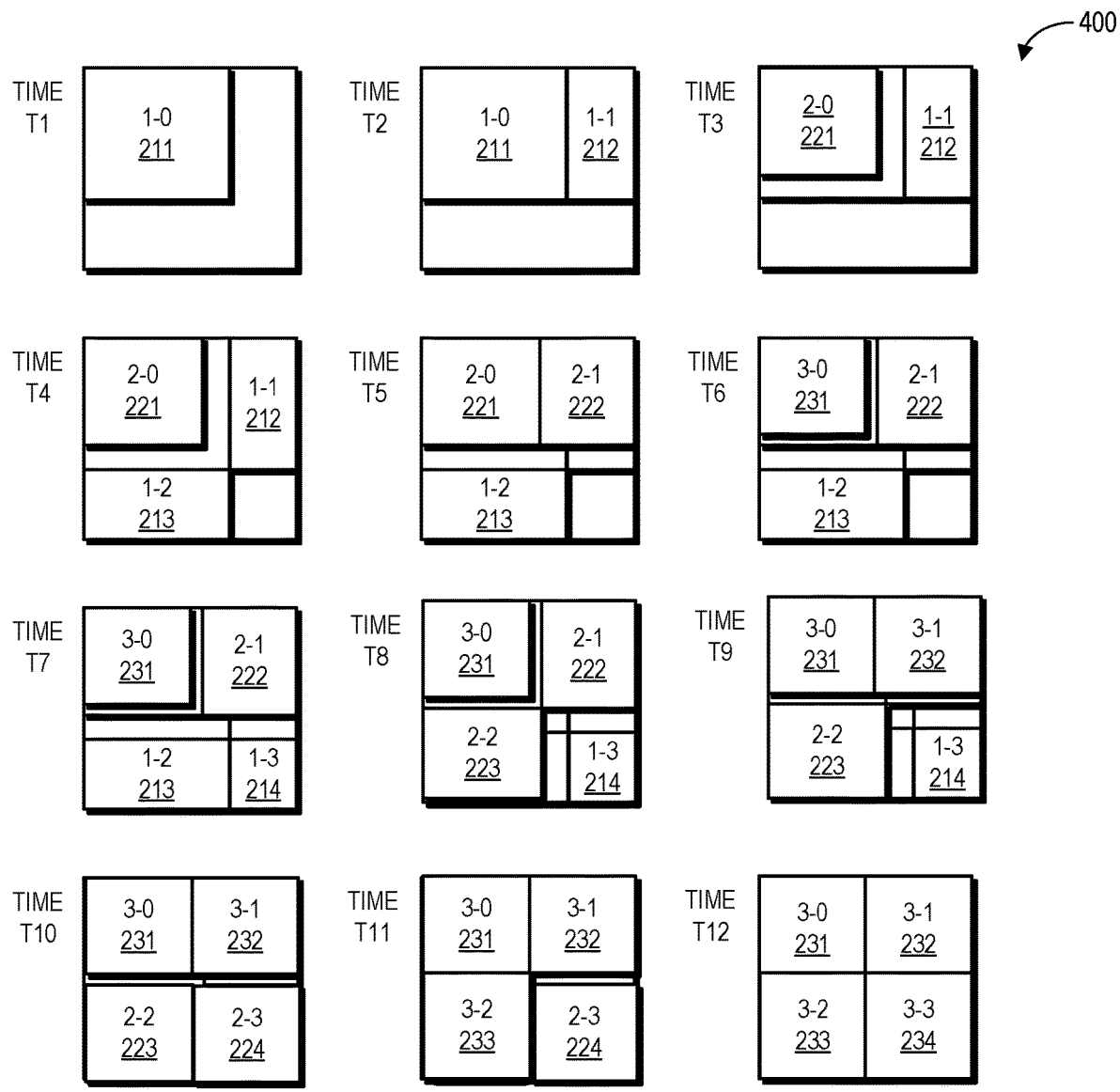
FIG. 5 is a diagram illustrating start positions of the interleaved portions of successive dispatches in accordance with some embodiments.

FIG. 5 is a diagram 400 illustrating relative start positions of the interleaved portions of successive dispatches in accordance with some embodiments. In the illustrated embodiment, the corresponding portions of the dispatches 210, 220, 230 are not all evenly sized and do not always share the same start positions. In the illustrated example, the dispatch partition and interleaving module 140 divides dispatch-3 230 into four equally-sized portions—portions 3-0 231, 3-1 232, 3-2 233, and 3-3 234—with the same starting positions as in the simple mapping scenario illustrated in FIG. 4, because dispatch-3 230 is a consumer dispatch. The portions of dispatch-2 220 that start at the first row and column of the grid of work items are wider and taller compared to the corresponding portions of dispatch-3 230, and the portions of dispatch-1 210 that start at the first row and column of the grid of work items are wider and taller compared to the corresponding portions of dispatch-2 220.

In some embodiments, for the remaining rows and columns, the dimensions of the portions of dispatch-1 210 and dispatch-2 220 are identical to portions of dispatch-3 230, except for the last row and column. For the last row and column, the dimensions of the portions of dispatch-1 210 and dispatch-2 220 are clamped to the dimensions of dispatch-1 210 and dispatch-2 220, respectively. The dispatch partition and interleaving module 140 calculates the start positions of the remaining portions of dispatch-1 210 and dispatch-2 220 (i.e., portions 1-1 212, 1-2 213, 1-3 214, 2-1 222, 2-2 223, 2-3 234) by adding to the start positions the same amount of work items (thread groups) that was added to the dimensions of the first row and first column of portions of dispatch-1 210 and dispatch-2 220. By sizing the portions of producer dispatches to be larger than the corresponding portions of consumer dispatches and offsetting the start positions of the portions, the dispatch partition and interleaving module 140 enables the work items of the consumer dispatches to have access to data produced by neighboring work items of the producer dispatches so they can perform operations such as filtering or averaging.

At time T1, portion 1-0 211 executes, with a start position in the upper left corner of the grid of work items. At time T2, portions 1-0 211 and 1-1 212 execute. Portion 1-1 212 has a start position to the right of the upper middle of the grid of work items, starting where portion 1-0 211 ends on a horizontal axis. Because portions 1-0 211 and 1-1 212 are both portions of the dispatch-1 210, there is no barrier between them and they can have overlapping executions. At time T3, portions 2-0 221 and 1-1 212 execute, with a start position for portion 2-0 221 in the upper left corner of the grid of work items. Portion 2-0 221 is smaller than portion 1-0 211, which produces the data that portion 2-0 221 consumes, allowing the work items of portion 2-0 to perform operations on neighboring data of the corresponding work items of portion 1-0 211. Because portion 2-0 221 does not consume data produced by portion 1-1 212, portion 2-0 221 and portion 1-1 212 can have overlapping executions.

At time T4, portions 2-0 221, 1-1 212, and 1-2 213 execute. Portion 1-2 213 has a start position at the lower left of the grid of work items, starting where portion 1-0 211 ends on a vertical axis and ending at the bottom of the grid of work items. At time T5, portions 2-0 221, 2-1 222, and 1-2 213 execute. Portion 2-1 222 partially overlaps portions 1-0 211 and 1-1 212. Portion 2-1 222 is shorter and wider than portion 1-1 212, which produces data that portion 2-1 222 consumes. At time T6, portions 3-0 231, 2-1 222, and 1-2 213 execute. Portion 3-0 231 has the same starting position as and is smaller than portion 2-0 221, which produces the data that portion 3-0 231 consumes.

At time T7, portions 3-0 231, 2-1 222, 1-2 213, and 1-3 214 execute. Portion 1-3 214 has a start position in the lower right corner of the grid of work items, starting where portion 1-2 213 ends on the horizontal axis and where portion 2-1 222 ends on the vertical axis, and ending at the bottom right of the grid of work items. At time T8, portions 3-0 231, 2-1 222, 2-2 223, and 1-3 214 execute. Portion 2-2 223 is taller and narrower than portion 1-2 213, which produces data that portion 2-2 223 consumes. At time T9, portions 3-0 231, 3-1 232, 2-2 223, and 1-3 214 execute. Portion 3-1 232 is wider and shorter than portion 2-1 222, which produces data that portion 3-1 232 consumes.

At time T10, portions 3-1 231, 3-1 232, 2-2 223, and 2-3 224 execute. Portion 2-3 224 is taller and wider than portion 1-3 214, which produces data that portion 2-3 224 consumes. At time T11, portions 3-0 231, 3-1 232, 3-2 233, and 2-3 224 execute. Portion 3-2 233 is taller and narrower than portion 2-2 223, which produces data that portion 3-2 233 consumes. At time T12, portions 3-0 231, 3-1 232, 3-2 233, and 3-3 234 execute. Portion 3-3 234 is taller and wider than portion 2-3 224, which produces data that portion 3-3 234 consumes. As noted previously, portions 3-0 231, 3-1 232, 3-2 233, and 3-3 234 are equally sized, as their source dispatch, dispatch-3 230 is a consumer dispatch that does not produce data for subsequent dispatches.

Figure 6:
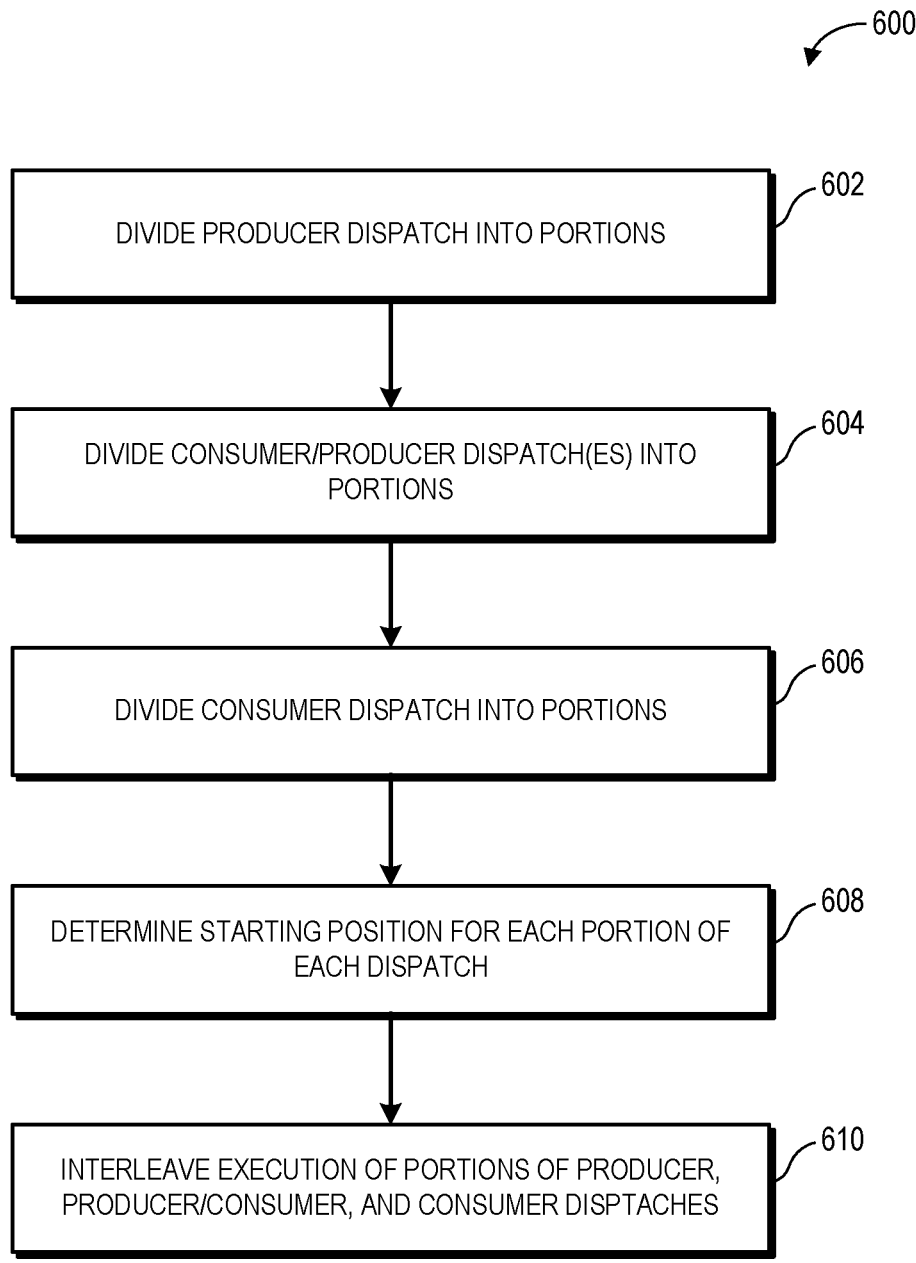
FIG. 6 is a flow diagram illustrating a method for dividing successive dispatches into portions and interleaving execution of the portions in accordance with some embodiments.

FIG. 6 is a flow diagram illustrating a method 600 for dividing successive dispatches into portions and interleaving execution of the portions in accordance with some embodiments. In some embodiments, the method 600 is performed by a processing system such as the processing system 100 illustrated in FIG. 1. At block 602, the dispatch partition and interleaving module 140 determines that a producer dispatch of consecutive dispatches having consumer/producer dependencies will produce data that exceeds the storage capacity of the cache 120. The dispatch partition and interleaving module 140 divides the producer dispatch (e.g., dispatch-1 210) into portions (e.g., portions 1-0 211, 1-1 212, 1-2 213, 1-3 214). In some embodiments, the portions have equal sizes, and in other embodiments, the portions are unevenly sized, with the first portion (e.g., portion 1-0 211) being larger than the remaining portions. At block 604, the dispatch partition and interleaving module 140 divides consumer/producer dispatches (e.g., dispatch-2 220) into portions (e.g., portions 2-0 221, 2-1 222, 2-2 223, 2-3 224). In some embodiments, the portions have equal sizes, and in other embodiments, the portions are unevenly sized, with the first portion (e.g., portion 2-0 221) being smaller than corresponding portion 1-0 211 that produces data consumed by portion 2-0 221.

At block 606, the dispatch partition and interleaving module 140 divides consumer dispatches (e.g., dispatch-3 230) into portions (e.g., portions 3-0 231, 3-1 232, 3-2 233, 3-3 234). In some embodiments, the portions have equal sizes, and in other embodiments, the portions are unevenly sized, with the first portion (e.g., portion 3-0 231) being smaller than corresponding portion 2-0 221 that produces data consumed by portion 3-0 231. At block 608, the dispatch partition and interleaving module 140 determines a starting position for each portion of each dispatch. In embodiments in which the portions are equally sized, each corresponding portion of each dispatch has the same starting position (i.e., portions 1-0 211, 2-0 221 and 3-0 231 have the same starting position, portions 1-1 212, 2-1 222, and 3-1 232 have the same starting positions, portions 1-2 213, 2-2 223, and 3-2 233 have the same starting positions, and portions 1-3 214, 2-3 224, and 3-3 234 have the same starting positions). In embodiments in which the portions are unevenly sized, each corresponding portion of each consumer/producer or consumer dispatch other than the initial portion of each dispatch has a starting position that is offset from the starting position of the producer dispatch from which it consumes data.

At block 610, the dispatch partition and interleaving module 140 interleaves execution of the portions of the producer, producer/consumer, and consumer dispatches. For example, the dispatch partition and interleaving module 140 schedules the first portion (portion 1-0 211) of dispatch-1 210 for execution at one or more of the compute units 115. In response to portion 1-0 211 completing execution, the dispatch partition and interleaving module 140 schedules the first portion (portion 2-0 221) of dispatch-2 220 for execution at one or more of the compute units 115. In response to portion 2-0 221 completing execution, the dispatch partition and interleaving module 140 schedules the first portion (portion 3-0 231 of dispatch-3 230 for execution at one or more of the compute units 115. In response to portion 3-0 231 completing execution, the dispatch partition and interleaving module 140 schedules the second portion (portion 1-1 212) of dispatch-1 210 for execution at one or more of the compute units 115. The dispatch partition and interleaving module 140 continues scheduling portions of the dispatches, alternating between dispatches for each portion, until the last consumer dispatch has completed execution.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   executing a first portion of a first dispatch of work items that write data to a cache, the first dispatch comprising a first plurality of portions, wherein an amount of data written to the cache by the first portion of the first dispatch does not exceed a storage capacity of the cache; and
   in response to the first portion of the first dispatch of work items completing execution, executing a first portion of a second dispatch of work items that read data written to the cache by the first portion of the first dispatch, the second dispatch comprising a second plurality of portions.

2. The method of claim 1, further comprising:
   in response to the first portion of the second dispatch of work items completing execution, executing a first portion of a third dispatch of work items that read data written to the cache by at least one of the first portion of the first dispatch and the first portion of the second dispatch, the third dispatch comprising a third plurality of portions.

3. The method of claim 1, further comprising:
   in response to the first portion of the second dispatch of work items completing execution, executing a second portion of the first dispatch of work items that write data to the cache.

4. The method of claim 3, further comprising:
   in response to the second portion of the first dispatch of work items completing execution, executing a second portion of the second dispatch of work items that read data written to the cache by at least one of the first portion of the first dispatch and the second portion of the first dispatch.

5. The method of claim 1, wherein the first portion of the first dispatch of work items is larger than the first portion of the second dispatch of work items.

6. The method of claim 1, further comprising:
   dividing the first dispatch of work items into the first plurality of portions; and
   dividing the second dispatch of work items into the second plurality of portions.

7. The method of claim 1, wherein the first plurality of portions and the second plurality of portions are unevenly sized.

8. The method of claim 6, further comprising:
   interleaving execution of the first plurality of portions with execution of the second plurality of portions.

9. The method of claim 2, further comprising:
   dividing the third dispatch of work items into the third plurality of portions.

10. The method of claim 9, further comprising:
    interleaving execution of the third plurality of portions with execution of the first plurality of portions and execution of the second plurality of portions.

11. A device comprising:
    a cache; and
    a processor to:
      execute a first portion of a first dispatch of work items that write data to the cache, the first dispatch comprising a first plurality of portions, wherein an amount of data written to the cache by the first portion of the first dispatch does not exceed a storage capacity of the cache; and
      in response to the first portion of the first dispatch of work items completing execution, execute a first portion of a second dispatch of work items that read data written to the cache by the first portion of the first dispatch, the second dispatch comprising a second plurality of portions.

12. The device of claim 11, wherein the processor is further to:
    in response to the first portion of the second dispatch of work items completing execution, execute a first portion of a third dispatch of work items that read data written to the cache by at least one of the first portion of the first dispatch and the first portion of the second dispatch, the third dispatch comprising a third plurality of portions.

13. The device of claim 11, wherein the processor is further to:
    in response to the first portion of the second dispatch of work items completing execution, execute a second portion of the first dispatch of work items that write data to the cache.

14. The device of claim 13, wherein the processor is further to:
    in response to the second portion of the first dispatch of work items completing execution, execute a second portion of the second dispatch of work items that read data written to the cache by at least one of the first portion of the first dispatch and the second portion of the first dispatch.

15. The device of claim 11, wherein the first portion of the first dispatch of work items is larger than the first portion of the second dispatch of work items.

16. The device of claim 11, wherein the processor is further to:
    divide the first dispatch of work items into the first plurality of portions; and divide the second dispatch of work items into the second plurality of portions.

17. The device of claim 11, wherein the first plurality of portions and the second plurality of portions are unevenly sized.

18. The device of claim 16, wherein the processor is further to:
   interleave execution of the first plurality of portions with execution of the second plurality of portions.

19. The device of claim 12, wherein the processor is further to:
   divide the third dispatch of work items into the third plurality of portions.

20. The device of claim 19, wherein the processor is further to:
   interleave execution of the third plurality of portions with execution of the first plurality of portions and execution of the second plurality of portions.

\* \* \* \* \*